United States Patent Office 3,423,098
Patented Jan. 21, 1969

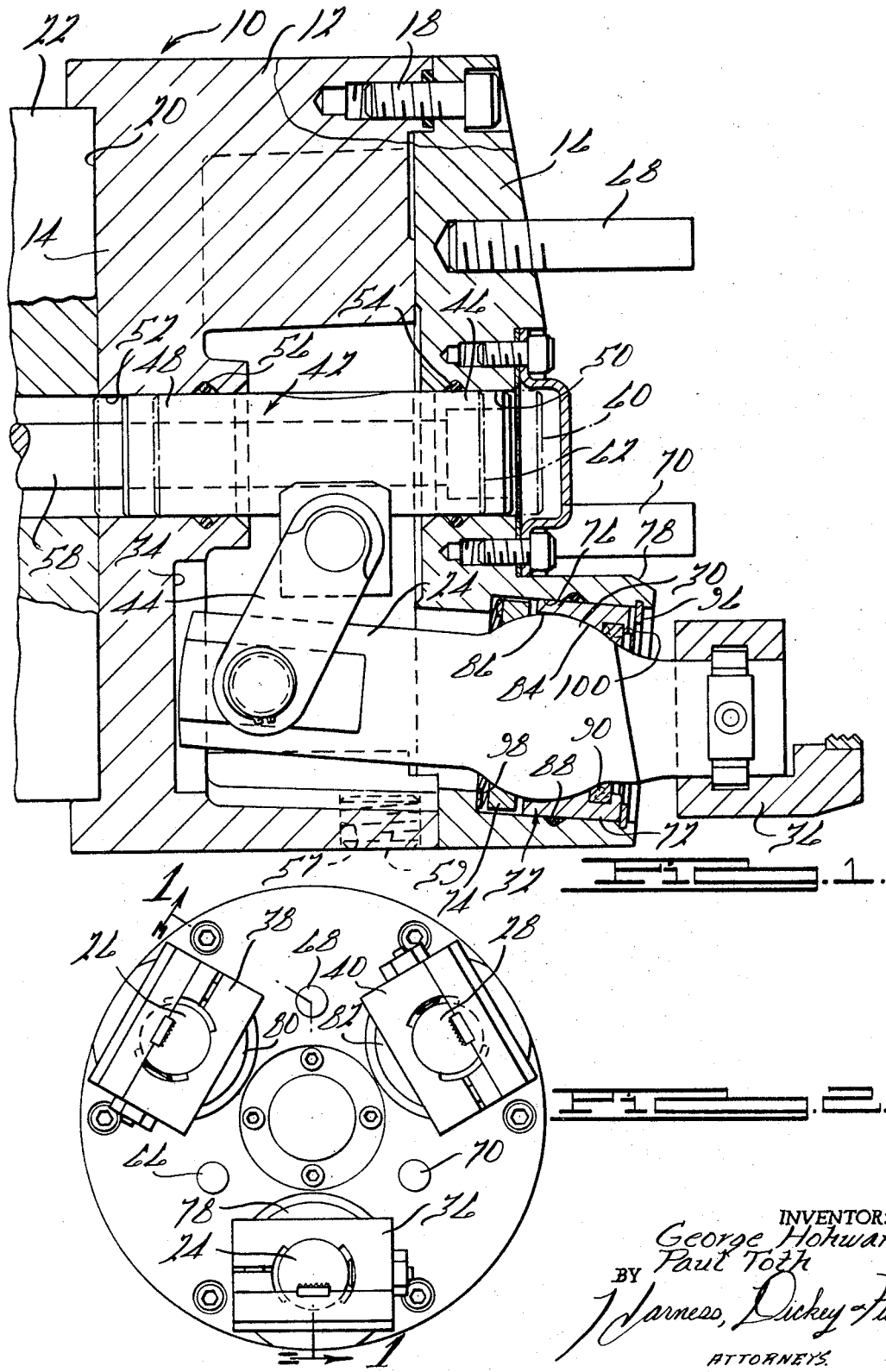

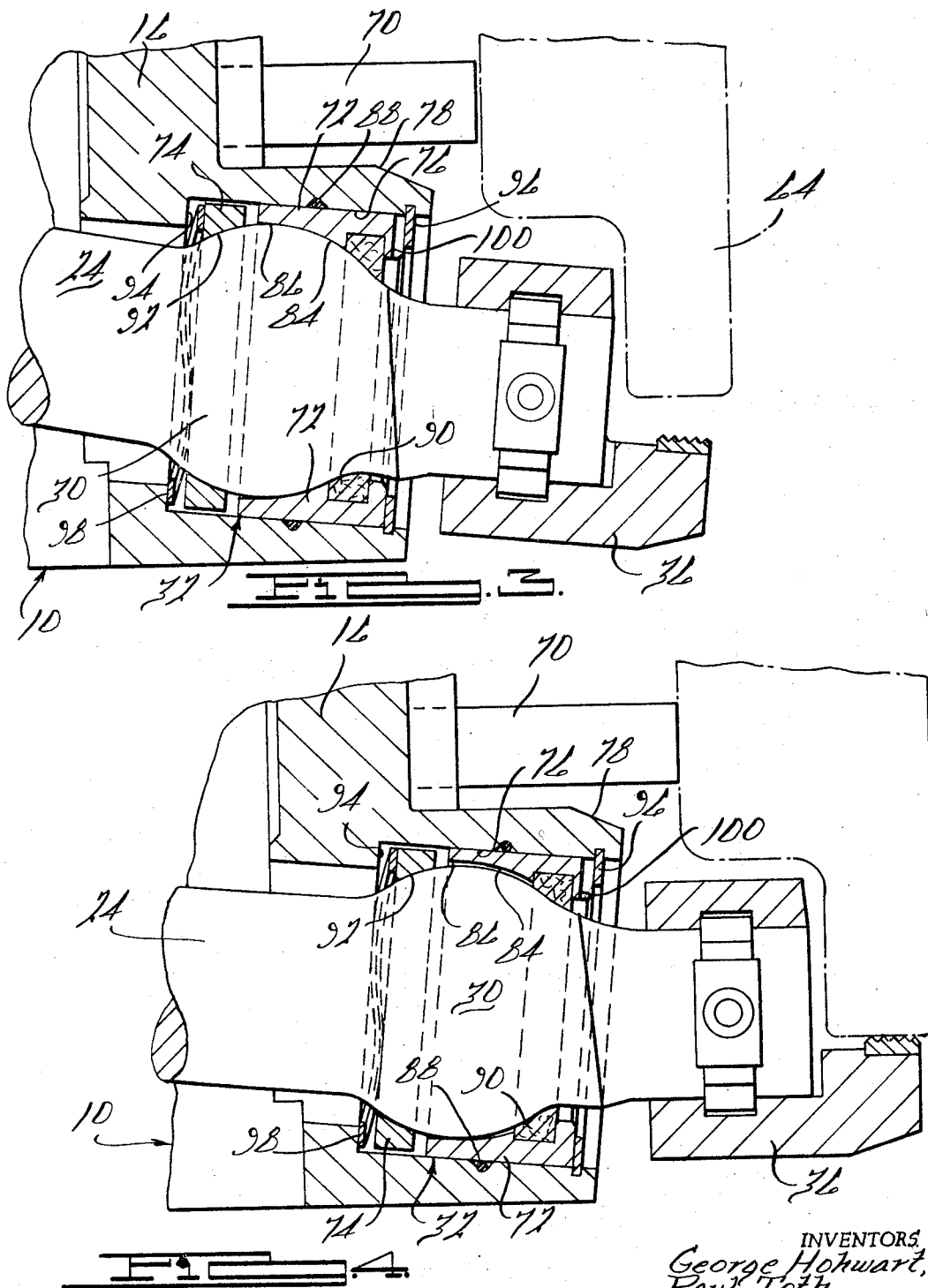

3,423,098
BALL CHUCK WITH ROLL-BACK BEARING
George Hohwart, Farmington, and Paul Toth, Allen Park, Mich., assignors to N. A. Woodworth Company, Ferndale, Mich., a corporation of Michigan
Filed May 25, 1966, Ser. No. 552,869
U.S. Cl. 279—109  6 Claims
Int. Cl. B23b 31/18

ABSTRACT OF THE DISCLOSURE

This invention is concerned particularly with improved swivel mountings for the rocker arms that carry the work clamping jaws. In this invention, the mountings are uniquely constructed to pull the workpiece back against fixed stops automatically under clamping pressure regardless of the diameter of the work or its relation to the spacing of the rocker arms. In addition, the swivel mountings are uniquely constructed to permit radial adjustment of the rocker arms to compensate for variations in different chucks due to manufacturing tolerances or other causes and to assure precise alignment of the clamped workpiece with respect to the center of the chuck. Further, in this latter connection chucks of the type here under consideration are adapted to be piloted on and fixed to the spindle of a machine tool or the like, and the adjustment feature last referred to makes it possible to move the individual rocker arms and work clamping jaws radially within limits to assure precise alignment of a workpiece clamped in the chuck with the rotational axis of the spindle. Moreover, the swivel mountings for the rocker arms have been specially designed and constructed for easy assembly and disassembly and the seal with which mountings of this type conventionally are equipped is uniquely disposed for convenient servicing or replacement.

---

This invention relates to work holding chucks of the type shown in the Hohwart et al. Patent No. 3,099,457 dated July 30, 1963, in which work holding and clamping jaws are mounted on swivelled rocker arms which are power operated in unison to open and close the jaws.

Background of the invention

While chucks of the type disclosed in the patent hereinabove referred to have been manufactured for a number of years and have been commercially quite successful, they have the disadvantage that the work clamping faces of the jaws must be kept inside the pivot centers of the rocker arms in order to provide pull-back action that holds the clamped workpiece against end stops which locate the work axially in the chuck. This requirement has considerably limited the capacity of the chuck as compared to conventional sliding jaw chucks, for example, which have a capacity almost equal to the outside diameter of the chuck body. In the chuck of this invention, the swivel mountings for the rocker arms embody unique roll-back bearings which provide pull-back action even though the chuck jaws grip the workpiece outside the pivot centers of the rocker arms. As a result, the capacity of the chuck is very considerably increased. At the same time, as previously suggested, the swivel mountings for the rocker arms have been specially designed to permit easy adjustment of the arms relative to the rotational axis of the chuck, to provide for easier assembly and disassembly of the mountings and to provide an improved seal arrangement therefor.

Description of the invention

For a more detailed description of the invention, reference is now had to the accompanying drawings, wherein:

FIGURE 1 is a longitudinal view, showing parts in section and parts in elevation, of a chuck embodying the invention and particularly illustrating the improved swivel mountings for the rocker arms of the chuck;

FIGURE 2 is an end or face view of the chuck;

FIGURE 3 is an enlarged, fragmentary sectional view similar to FIGURE 1 but showing the jaws open and a workpiece in position to be clamped, and FIGURE 4 is a view similar to FIGURE 3 but showing the jaws closed and the workpiece held solidly against end stops as a result of the pull-back action achieved by the improved swivel mountings of this invention.

A detailed description of the basic chuck structure and operation may be had from the specification and drawings of the patent referred to above, and that disclosure is incorporated by reference herein. However, a brief description thereof is now given which should be adequate for an understanding of the chuck and its relation to the special swivel mountings comprising the present invention.

More particularly, the chuck here shown comprises a generally cup-shaped hollow body 10 having an annular, generally cylindrical side wall 12 and a bottom wall 14. The front of the body 10 normally is closed by a face plate 16 which is detachably fastened to the side wall 12 by screws 18; and the bottom wall 14 is formed externally thereof with a central recess 20 which is adapted to receive and to snugly fit the end of the spindle 22 of a machine tool or the like. The snug fit between the body 10 and the spindle 22 prevents the chuck from shifting laterally on the spindle, and suitable fastening screws (not shown) are provided for attaching the body securely to the spindle.

Three rocker arms 24, 26, and 28 arranged concentrically around the axis of the chuck and spaced equidistantly apart extend through the face plate 16, and spherical journal portions 30 formed on the rocker arms intermediate the ends thereof are confined in special swivel mountings 32 carried by the face plate. Only one rocker arm 24 is shown in detail in the enlarged views provided by FIGURES 1, 3 and 4, but it will be readily apparent all of the rocker arms 24, 26 and 28 are identical in construction and they are similarly retained and confined in identical swivel mountings such as the one shown at 32. Those portions of the rocker arms 24, 26 and 28 extending inwardly from the journal portions 32 are contained entirely within the body 10, and the inner ends thereof extend into radial ways 34 provided in the bottom 14 which guide and constrain the oscillatory or pivotal motion of the arms in the mountings 32. Work clamping jaws 36, 38 and 40 mounted on the outer ends of respective rocker arms 24, 26 and 28 move into and out of engagement with a workpiece to clamp or release the same as the arms rock in the swivel mountings 32 in the radial path permitted by the guide ways 34. In this connection, it will be readily appreciated that the jaws 36, 38 and 40 usually are specially formed to accommodate a particular size and shape of workpiece and they are detachably fastened to the arms so that different sets of jaws can be used depending on the exigencies of the particular situation.

Rocker arms 24, 26 and 28 and their work clamping jaws 36, 38 and 40 are moved in unison in the manner described by a reciprocable spider 42 disposed centrally within the body 10 and radially extending toggle links 44 which are pivoted to the spider and to the inner ends of the rocker arms. As shown in FIGURE 1, the spider 42 has forwardly and rearwardly extending journal portions 46 and 48 which fit snugly but slidably in aligned openings 50 and 52 provided in the bottom 14 and face plate 16, respectively. O-rings 54 and 56 seal the joints between the journals 46 and 48 and their respective openings 50 and 52 and prevent lubricant liquid with which the body 10 normally is at least partially filled from escaping along the journals.

Lubricant liquid in the body 10 keeps bearings and all of the internal moving parts of the chuck properly lubricated at all times. To this end, the cylindrical side wall 12 of the body 10 is provided with a port 57 through which lubricant can be introduced into the body 10 or drained therefrom and the port normally is closed by suitable threaded plug 59.

Any suitable or conventional means may be provided for reciprocably actuating the spider 42 within the body 10 and in the particular form of the invention here shown, the spindle 22 is equipped with a drawbar 58 which extends axially therethrough and is fastened to the spider at its forward end. It is conventional in machines of the type here referred to for the drawbar to be equipped with a power cylinder or other actuator at the rearward end thereof. The toggle links 44 normally are inclined with respect to the spider 42 and the rocker arms 24, 26 and 28 as shown in FIGURE 1 and, when the drawbar is advanced to move the spider 42 to the extreme forward position shown at 60 in FIGURE 1, the toggle links move the inner ends of the rocker arms radially inwardly to fully open the work clamping jaws 36, 38 and 40. Contrariwise, when the drawbar 58 is retracted to move the spider 42 to the rearmost position shown at 62 in FIGURE 1, the toggle links 44 straighten and move the inner ends of the rocker arms 24, 26 and 28 radially outwardly to close work clamping jaws 36, 38 and 40.

When the jaws 36, 38 and 40 are open as shown in FIGURE 3, a workpiece such as the one shown in 64, can be readily placed within the jaws either manually or by suitable automatic means; and, when the jaws are closed as shown in FIGURE 4, they engage and clamp the workpiece 64, solidly in the chuck. As suggested, it is desirable that the jaws 36, 38 and 40 pull the workpiece 64 back into the chuck and against locating pins 66, 68 and 70 carried by the face plate 16 and forming stops which locate the work precisely axially in the chuck.

From the foregoing it will be readily apparent that if the clamping faces of the jaws 36, 38 and 40 are disposed radially inwardly of the centers about which the journal portions 30 turn at the time they close on the workpiece 64, they rock radially inwardly and rearwardly (viz., toward the face of the chuck) as clamping pressure is applied to the work. As a result, the jaws 36, 38 and 40 grab the work 64 tightly and simultaneously pull it back against the locating pins 66, 68 and 70. This is the desired action as it positions the work accurately axially in the chuck so that radial surfaces on the workpiece can be machined or otherwise finished to an exact dimension within predetermined relatively close manufacturing tolerances. On the other hand, if the clamping faces of the jaws 36, 38 and 40 are disposed radially outwardly of the pivot centers of the rocker arms 24, 26 and 28 and if the work to be clamped is larger in diameter than the diameter of a circle passing through these centers, the jaws move radially inwardly and outwardly (viz., away from the face of the chuck) at the time they engage the work 64 and they continue to move in this direction as clamping pressure is applied. Thus, the last increment of movement of the jaws 36, 38 and 40 as they move to the fully clamped position, tends to lift the work 64 off of the locating pins 66, 68, and 70, and this is undesirable in a chuck of this type. For one thing, the workpiece 64 is less securely clamped in the chuck and, for another, the work is not positioned precisely axially in the chuck so that machining operations involving radial surfaces of the work cannot be performed with requisite accuracy and preciseness. In a production run, for example, successive workpieces clamped under the circumstances last described, will likely be disposed in different axial positions in the chuck due to variations in the position of the workpieces at the instant of clamping on to variations in the size of the workpieces which may vary any amount within the range of permissible manufacturing tolerances. Also, experience has shown that under these circumstances the same workpiece may be clamped and held in different axial positions in the chuck apparently because of variations in the initial position of the work and also perhaps because of variations in the function of the working parts of the chuck as they accept the strain of full clamping pressure. Thus it is essential as a practical matter that the clamping jaws pull the workpiece back against fixed stops during each clamping operation in order to obtain and assure essential uniform positioning of the work in the chuck.

In view of the foregoing circumstances, it has been thought that chucks of the type here under consideration could not be made to operate with pull-back action, if the work holding jaws were formed to clamp a workpiece which is larger in diameter than the pivot circle of the rocker arms. This, in turn, of course, considerably limited the capacity of the chuck for a given size of chuck body; and, in practice, it has sometimes proved to be a marked disadvantage. However, this disadvantage has now been overcome by redesigning the swivel mounting 32. As now constructed, these mountings provide pull-back action for the chuck even though the work is larger in diameter than the pivot circle of the rocker arms. Since all of the swivel mountings 32 are identical in construction and operation, a detailed description of but one is here given; and to this end attention is now directed to FIGS. 3 and 4 which show the novel structure and mode of operation of the swivel mounting 32.

More particularly, the swivel mounting 32 comprises a front annular bearing member 72 and a rear annular bearing member 74 disposed in axially spaced relation in an opening 76 provided in the face plate 16 and on opposite sides of the spherical journal portion 30 of the rocker arm 24. In order to accommodate the journal portions 30 of the rocker arms 24, 26 and 28 and the swivel mountings 32, the face plate 16 is formed at the arm locations with outwardly extending embossments 78, 80 and 82 (FIGURE 2), and the opening 76 in each instance is disposed centrally of the embossment. As shown in FIGURES 3 and 4, the front bearing member 72 fits snugly but rotatably in the opening 76, and the inner annular surface thereof is formed with a curvilinear of spherically curved forward portion 84 which seats rearwardly against and preferably complements the front portion of the journal 30. The rear portion 86 of the inner annular surface of the front bearing member 72 is generally cylindrical in form and it merges smoothly with the spherically curved front portion 84. Since the rear surface 86 extends from the point of maximum diameter of the curved surface 84 and rearwardly along the spherical journal portion 30 it normally is disposed in rearwardly diverging relation with respect to the journal as shown in FIGURE 3. An O-ring recessed in the opening 76 and surrounding the front bearing member 72 seals the joint between the bearing and the opening, and a sealing ring 90 recessed in the curvilinear front surface 84 surrounds the journal portion 30 and seals the joint therebetween. The rear bearing member 74 also surrounds the journal portion 30 but it is considerably smaller in diameter than the opening 76 so as to be freely movable axially and radially in the opening. As the rear bearing member 74 seats well back on the curved rear portion of the journal 30, it is formed with a curvilinear or spherically curved inner surface 92 which preferably complements the surface on which it bears. In this connection, it will be observed that the front portion of the opening 76 which accommodates the swivel mounting 32 is larger in diameter than the rear portion through which the rocker arm 24 extends into the body 10, and the two portions of the opening are joined by a radial shoulder 94 which is behind and spaced from the normal position of the bearing member 74. A snap ring 96 in the opening 76 ahead of the front bearing member 72 holds the latter securely in the opening, and a heavy pressure, wave type spring washer 98 confined between the rear bearing member 74 and the shoulder 98 maintains yielding pressure against the bearing member to hold the latter pressed against the journal 30 and the journal pressed normally against the front bearing member 72.

The normal positions of the several components of the swivel mounting 32 is shown in FIGURE 3, and it will be observed that the spring 98 holds everything forwardly against the snap ring 96, and both the front and rear bearing members 72 and 74 tightly against the spherical journal 30. Furthermore, the spring 78 is sufficiently strong to hold the parts of the mounting firmly together during operation of the chuck. However, after the jaws 36, 38 and 40 close on a workpiece such as the one shown at 64, for example, and clamping pressure is applied by the drawbar 58 through the toggle links 44 and the rocker arms 24, 26 and 28, the journal portions 30 of the rocker arms roll back away from the curved front bearing surfaces 84 of the front bearing members 72 and onto the rear cylindrical surfaces 86. In doing this, of course, the journal portions 30 above the rear bearing members 74 back against the springs 98 and they continue to roll back on the cylindrical surfaces 86 until the workpiece 64 seats on the stops 66, 68 and 70, as shown in FIGURE 4. This roll-back action of the journals 30 provides pullback action for the chuck regardless of whether the clamping face of the jaws 36, 38 and 40 are spaced farther apart or closer together than the turning centers of the journals 30. In the drawings, the jaw faces are shown to be at the outer sides of the clamping arms so that they rock radially inwardly and away from the face plate 16 as they move from the open position shown in FIGURE 3 to the closed position shown in FIGURE 4 and during the clamping operation. However, because of the unique construction of the swivel mountings 32, the movement of the clamping jaws away from the face plate 16 is compensated by the roll-back action of the journals in the swivel mountings and the workpiece is pulled back solidly against the locating pins 66, 68 and 70 to position the work precisely axially in the chuck.

From the foregoing, it will be readily apparent also that any of the front bearing members 72 can be readily removed for servicing or replacement of the seal 90 associated therewith simply by removing the work clamping jaw from the outer end of the rocker arm and the snap ring 96 from the opening 76. The bearing member 72 can then be readily lifted out of the opening 76 exposing the seal 90.

The seals 90 preferably are of flexible and resilient neoprene or a similar oil resistant material which not only stops the flow of lubricant outwardly along the rocker arms but also expands and retracts as required to maintain effective sealing engagement with the rocker arms at all times. In this connection it will be noted that the seals 90 must necessarily expand slightly when the journal portions 30 roll back on the rolling surfaces 86 of the front bearing members 72 during clamping of a workpiece in order to maintain an effective seal. This is important as the chuck may be rotatably driven at relatively high speeds with a workpiece clamped in the jaws and rotation of the chuck causes the lubricant liquid in the body 10 to be thrown by centrifugal force outwardly against the periphery of the body. This has the advantage that all of the moving parts of the chuck at or adjacent the periphery thereof are thoroughly lubricated each time the chuck is operated; however, it also means that effective seals must be maintained particularly around the rocker arms 24, 26 and 28.

It is a further feature of the invention that the front bearing members 72 are uniquely constructed to permit ready adjustment of the rocker arms radially within limits to compensate for variations in manufacturing tolerances in the various components and parts of the chuck and to assure precise positioning of the workpiece 62 at the center of the chuck and on the rotational axis of the spindle 22. This is accomplished according to the present invention by making the inner annular surfaces 84 and 86 of the bearing members 72 eccentric with respect to the outer peripheral surfaces thereof and by providing some means for rotational adjustment of the bearing members as, for example, conventional spanner wrench holes or a notch 100 in the front face of each member. In the case of a notch 100, it preferably is located in a fixed predetermined relation to the eccentric inner surface of the bearing member 72 so that the angular or rotational adjusted position of the member can be easily determined. Rotational adjustment of any bearing member is easily achieved by tapping a punch seated in the notch 100. Of course, a similar orientation of the spanner wrench holes can be made to achieve the same purpose. As previously noted, the bearing members 72 fit the openings 76 snugly so as to remain in selected adjusted positions but not so tightly that they cannot be readily adjusted rotatably in the manner described above.

Having thus described the invention, we claim:

1. In a chuck of the type including a plurality of jaw-carrying rocker arms having swivelled spherical journal portions and jaws thereon which mutually cooperate to engage and clamp a workpiece, improved swivel mountings for said rocker arms comprising:

axially movable rear bearing means seating forwardly against the rear spherical surfaces of said journal portions, normally fixed front bearing means seating rearwardly against the forward spherical surfaces of said journal portions, and spring means behind said rear bearing members urging the same against said journal portions and the latter against said front bearing means, said front bearing means having forwardly converging curvilinear inner surfaces normally bearing on and seating their respective journal portions, and generally cylindrical rolling surfaces blending smoothly with and extending rearwardly from said curvilinear surfaces on which said journal portions roll rearwardly and away from said curvilinear surfaces against the yielding resilient action of said spring means when said jaws clampingly engage a workpiece whereby the workpiece is pulled back in the chuck during the clamping operation.

2. The combination as set forth in claim 1 wherein:

the chuck is rotatable and said rocker arms extend through openings in the face of the chuck, said openings being arranged concentrically around the axis of rotation, and wherein said front bearing means are annular in form, the cylindrical outer surface of said front bearing means fitting snugly but rotatably in said openings and the inner annular seating and rolling surfaces thereof being eccentric with respect to said outer surface, whereby variations in the spacing of said rocker arms from the axis of said chuck within the eccentric range of said front bearing means can be compensated by rotational adjustment of said bearing means in said openings.

3. The combination as set forth in claim 2 including:

annular seals between said front bearing means and said journal portions, and means on and movable with said front bearing means ahead of said seals accessible for use in rotatably adjusting said bearing means.

4. The combination as set forth in claim 2 including:

annular seals recessed in said front bearing means and seating on said journal portions, snap ring fasteners in the openings ahead of said front bearing means overlapping the outer marginal portions only of the latter and retaining the same in said openings, and means on the exposed inner marginal portions of said front bearing means accessible through said openings for rotatable adjustment of said front bearing means in said openings.

5. In a chuck of the type including a plurality of jaw-carrying rocker arms having swiveled spherical journal portions and jaws on said rocker arms which mutually cooperate to engage and clamp a workpiece in the chuck,
improved swivel mountings for said rocker arms comprising annular bearings surrounding the spherical journal portions of said rocker arms,
said bearings having annular seats for said journal portions and rolling surfaces extending from said seats and along and radially outwardly from said journal portions, and
means exerting yielding pressure against said journal portions in the direction of said annular seats holding the same normally against said seats but permitting said journal portions to move back on said rolling surfaces under clamping pressure.

6. The combination as set forth in claim 5 including:
a body carrying said rocker arms and said swivel mountings,
said body having a pilot mounting for fastening the same to the spindle of a machine tool or the like, and
wherein said swivel mountings include eccentric means for adjusting said rocker arms individually radially of the chuck and of the rotational axis of said spindle.

References Cited

UNITED STATES PATENTS

| 1,812,017 | 6/1931 | Page | 279—106 |
| 1,881,905 | 10/1932 | Page | 279—106 |

ROBERT C. RIORDON, *Primary Examiner.*

J. C. PETERS, *Assistant Examiner.*